United States Patent [19]

Provolo

[11] Patent Number: 4,544,425
[45] Date of Patent: Oct. 1, 1985

[54] METHOD FOR ATTACHING WHEELS TO DUAL WHEEL CASTERS, INCLUDING ULTRASONIC WELDING

[75] Inventor: Daniel J. Provolo, Fairfield, Conn.

[73] Assignee: Stewart-Warner Corporation, Chicago, Ill.

[21] Appl. No.: 587,042

[22] Filed: Mar. 7, 1984

[51] Int. Cl.⁴ .............................................. B60B 37/04
[52] U.S. Cl. ........................................ 156/73.1; 16/46; 16/47; 16/DIG. 42; 301/122; 403/326
[58] Field of Search ................... 16/37, 38, 39, 45, 46, 16/47, 48, DIG. 42; 156/73.1; 29/159.3, 437; 403/326; 301/63 PW, 111, 119, 122

[56] References Cited

U.S. PATENT DOCUMENTS

| | | | |
|---|---|---|---|
| 1,912,795 | 6/1933 | Rice et al. | 16/38 X |
| 2,496,700 | 2/1950 | Cole | 403/326 X |
| 3,648,325 | 3/1972 | Cartwright et al. | 16/47 X |
| 3,966,520 | 6/1976 | Fallenbeck et al. | 156/73.1 |
| 4,391,350 | 7/1983 | Moriya | 16/38 X |

FOREIGN PATENT DOCUMENTS 2725445 12/1978 Fed. Rep. of Germany ..... 156/73.1

*Primary Examiner*—Fred Silverberg
*Attorney, Agent, or Firm*—A. G. Douvas

[57] ABSTRACT

A method and apparatus for attaching the wheels of a dual wheel caster to its axle with annular plastic bushings ultrasonically welded to the wheels that have three integral curved spring fingers that snap into annular recesses in the axle as the wheels are pushed onto the axle.

5 Claims, 10 Drawing Figures

METHOD FOR ATTACHING WHEELS TO DUAL WHEEL CASTERS, INCLUDING ULTRASONIC WELDING

BACKGROUND OF THE INVENTION

Lightweight dual wheel casters have found considerable commercial acceptance over the last decade for supporting office furniture and equipment as well as some residential furniture. As a result of this acceptance, the manufacture of lightweight dual wheel casters has been extremely competitive and engineering efforts to reduce the cost of the casters while maintaining adequate strength, reliability and durability have been keen.

Generally the casters include a central arcuate horn member that carries a vertically arranged pintle that fits within a socket plate fixed to the underside of the furniture or equipment to be supported in a manner so that the caster has swiveling motion. This horn carries a one or two-piece axle and usually the axle is non-rotatably fixed to the horn. Each of the wheels frequently has an integral hub with a central bore that is received on the projecting ends of the axle.

There have in the past been a plurality of methods for preventing removal of the wheels after the axle has been inserted into the wheel hubs. One method has been to form an annular rib inside the wheel bore that fits within an annular recess in the axle. This arrangement has not been found adequate because it is not possible to form the rib with enough radial thickness to do an adequate job of wheel locking. This is because the wheels are plastic and the central bore is formed with a core piece and the rib is formed by an annular recess in the core, and if a single core piece is used, which it must if the wheel bore is a closed end bore, the core itself will break the rib upon axial core removal unless the rib is radially shallow. Thus this method has not been found acceptable because the wheels can be easily removed after assembly, which is undesirable for this kind of caster because it decreases caster durability and reliability.

Another method of attaching wheels to this type of dual wheel caster is shown in U.S. Pat. No. 220,938 and this uses a U-shaped metal spring clip carried by the underside of the horn that has legs that fit over radial flanges on the inner surface of the wheels around the wheel hubs. The flanges on the hub significantly increase the cost of the wheel because they cannot be molded integrally with the wheel, and the spring clip frequently becomes dislodged from the lower side of the horn permitting the wheels to freely slide off the axle.

Another method of attaching dual wheel caster wheels is to form an axle receiving bore entirely through the wheel and attach a snap ring over an end of the axle projecting outwardly from each wheel. In this method the axle and snap ring are visible from the outside of the wheel and therefore require a hub cap or other decorative element to conceal the axle ends, which significantly increases the cost of the caster in this competitive market.

It is the primary object of the present invention to ameliorate the problems noted above in attaching wheels to relatively light-duty dual wheel casters.

SUMMARY OF THE PRESENT INVENTION

In accordance with the present invention an improved method of attaching the wheels of a dual wheel caster to an axle is provided that includes an annular plastic bushing that is sonic-welded to a stepped central bore in the wheels, and this bushing has three integral curved spring fingers that snap into frusto-conical recesses in the axle as the wheels are assembled over the ends of the axle.

This simple bushing not only positively locks the wheels axially on the ends of the axle, but also provides a bearing support for the wheel on the axle. If desired, the bushing can be constructed at a nominal cost of a somewhat higher lubricity plastic than the wheels to provide reduced frictional drag against rotational motion of the wheels on the axle.

Toward these ends the present caster includes an arcuate central horn having a vertical pintle boss constructed of a one-piece plastic molding with a metal transverse axle insert-molded therein. The axle has a central splined portion around which the horn is molded to prevent rotation of the axle with respect to the horn and its ends project laterally from the horn.

Each projecting end of the axle has an outer cylindrical surface forming a bearing for rotatably supporting the wheel in a first reduced cylindrical bearing surface in the stepped wheel bore. Adjacent this cylindrical bearing surace on the axle is an abutment recess including a flat annular radial surface contiguous with a frusto-conical surface that diverges in the direction of the horn. Between this recess and the horn is a second bearing surface on the axle equal in diameter to the first bearing surface and upon which the housing is rotatably supported.

The bushing is generally annular in configuration with a flange that abuts a wheel hub to limit inward movement of the bushing into the stepped wheel bore, and it has a plurality of integral axially extending fingers that curve radially inwardly to a diameter equal to the inner diameter of the recesses in the axle. The bushing flange has an annular forwardly projecting rim, triangular in cross-section, that defines an energy director for the sonic welding of the bushing to the wheel hub.

In assembly the wheels travel down a line with the inside hub of the wheel facing upwardly and the bushings are dropped into the stepped wheel bores with the energy director rims engaging the wheel hubs. The bushing flanges are then sonic-welded to the hub with a suitable ultrasonic welding tool rendering the bushing and the hub essentially a one-piece unit.

These assembled wheels are then pushed over the ends of the axle and during this movement the outer bearing surfaces on the axle spread the bushing fingers apart into an enlarged bore portion in the wheels, and as the outer axle bearing surface passes the ends of the fingers, the fingers snap radially inwardly into the axle recess permanently axially locking the wheels to the axle.

DETAILED DESCRIPTION OF THE PREFERRED EMBODIMENT

Figure 1:
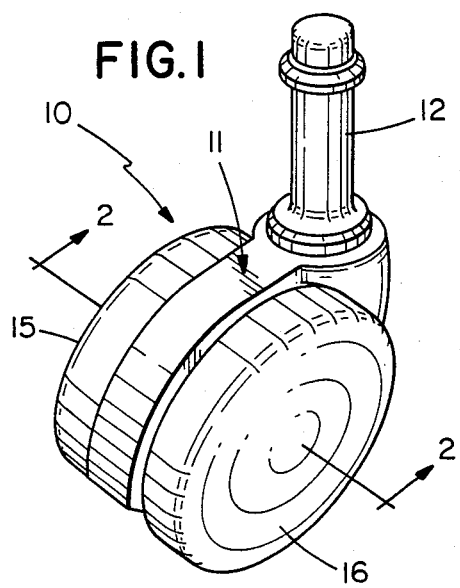
FIG. 1 is a perspective view of a dual wheel caster according to the present invention.

Viewing the drawings and particularly FIGS. 1 to 4, a dual wheel caster according to the present invention is generally designated by the reference numeral 10 and is seen to include an arcuate central horn 11 carrying a swivel pintle 12 and a horizontally extending axle 14 upon which wheels 15 and 16 are rotatably mounted. The wheels 15 and 16 are axially locked on axle 14 by a pair of identical bushings 19 and 20.

The horn 11, wheels 15 and 16 and bushings 19 and 20 are all constructed of a suitable high-impact plastic, such as nylon or delryn. The bushings 19 and 20 because they are molded separately from the wheels 15 and 16 and also act as bearings for the wheels, may alternatively be molded of a different plastic than the wheels, preferably a higher lubricity plastic at a nominal cost increment.

The axle 14 is insert-molded in the horn 11 and includes an enlarged central axially knurled portion 22 that prevents both rotational and axial movement of the axle with respect to horn 11.

Figure 8:
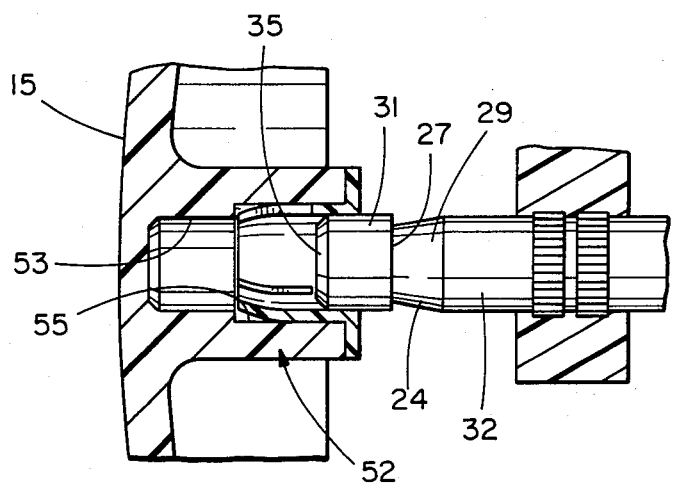
FIG. 8 is an enlarged longitudinal fragmentary view of the present caster illustrating one wheel in its initial stages of being pushed over one end of the axle.

The projecting ends of the axle 14 from the horn 11 are of uniform diameter except for recesses 24 and 25 which are identical to each other, and as seen more clearly in FIG. 8 include an annular radial surface 27 and an inwardly diverging frusto-conical surface 29.

The recesses 24 and 25 separate the axle ends into a first annular outer bearing surface 31 and a second annular inner bearing surface 32, both of the same diameter, and the distal ends of the axle have a short chamfer as indicated at 35.

Figure 3:
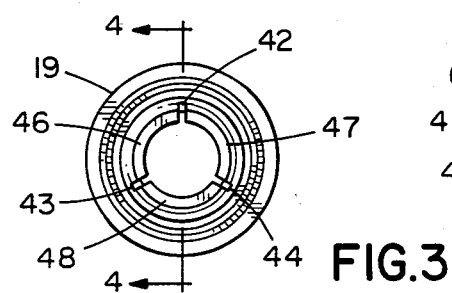
FIG. 3 is an enlarged side elevational view of one of the bushings illustrated in FIG. 2.
Figure 4:
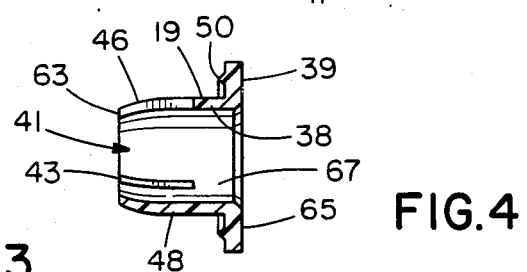
FIG. 4 is a longitudinal-section of one bushing taken generally along line 4—4 of FIG. 3.

Each of the bushings 19 and 20 is identical and as seen in FIGS. 3 and 4 generally annular in configuration with a central annular portion 38, from which an annular radially extending flange 39 extends, and a spheroidal portion 41 with axially extending slots 42, 43 and 44 therein that define resilient spring fingers 46, 47 and 48.

The relaxed inner diameter of the spring fingers 46, 47 and 48 adjacent the left end thereof as seen in the plane of FIG. 4 is equal to the diameter of axle 14 at the bottom of the recesses 24 and 25 at shoulder 27.

The bushing flange 39 has an axially extending annular rim 50 that is triangular in cross-section that assists in directing ultrasonic waves from a sonic welding tool through flange 39 into the wheels to provide improved welding of the bushings in the wheels. As seen more clearly in FIG. 8, each wheel has an inwardly directed central cylindrical hub 51 with a stepped closed end central bore therein defined by an inner bearing bore 53 and an outer enlarged bore 55. Wheel bore 53 is rotatably supported on axle bearing surface 31 and is several thousandths of an inch larger in diameter to provide clearance for supporting the wheel for free rotational movement on the axle. Wheel bore portion 55 has an axial length slightly greater than the axial length of the bushing and has a diameter equal to the outer diameter of bushing portion 38.

Figure 5:
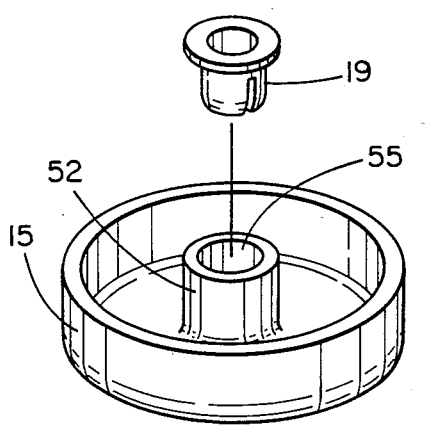
FIG. 5 is a perspective view of one bushing and one wheel prior to assembly.
Figure 6:
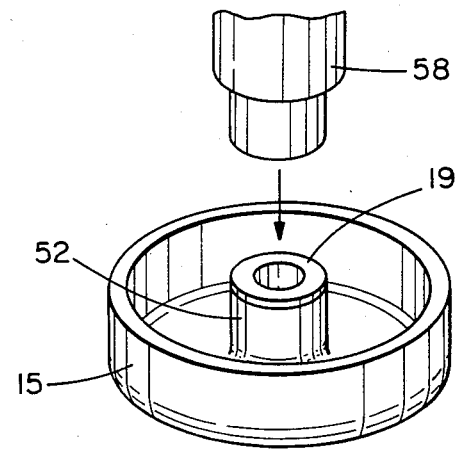
FIG. 6 is a perspective view of an assembled wheel and bushing with an ultrasonic welding tool approaching the bushing.
Figure 7:
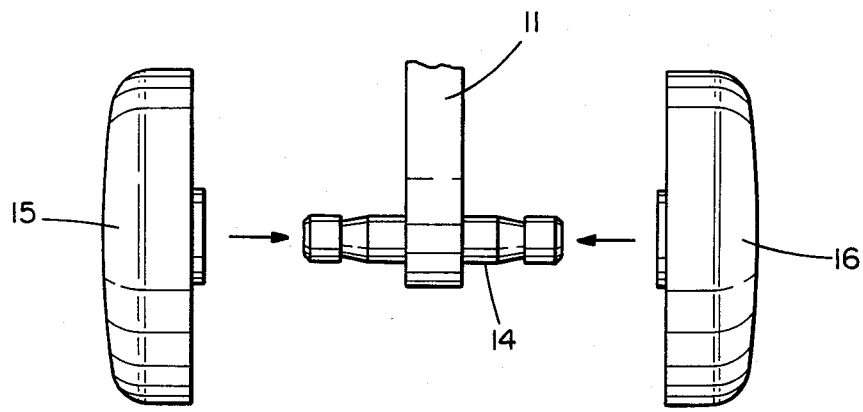
FIG. 7 is an exploded view of a pair of wheel assemblies just prior to being pushed over ends of the axle.
Figure 9:
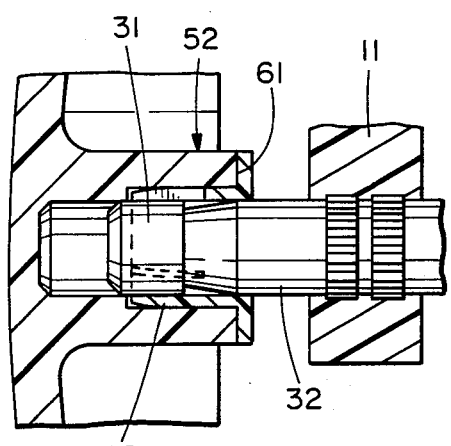
FIG. 9 is a fragmentary section similar to FIG. 8 with the end of the axle spreading the bushing fingers.
Figure 10:
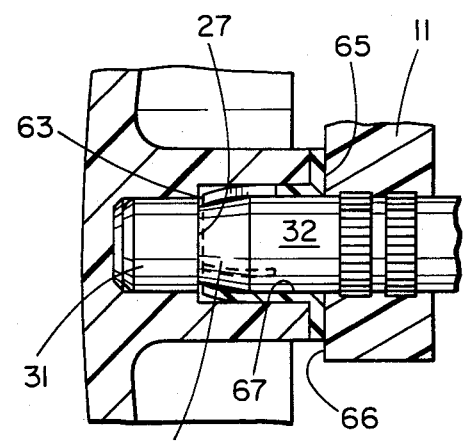
FIG. 10 is a fragmentary view, similar to FIGS. 8 and 9 with the wheel in its fully seated position on the axle, locked by the bushing.

As seen in FIGS. 5 and 6, the wheels during assembly pass down the assembly line with their inner surfaces facing upwardly and the bushings 19 are dropped vertically downwardly into wheel bore portions 55. Thereafter a suitable ultrasonic tool 58 is brought down into engagement with flange 39 to sonically weld the flange to hub outer surface 61 (see FIG. 9). The energy director 50 assists in directing the sonic waves through the flange into the surface 61 of the wheel hubs 52.

Then, as depicted in FIGS. 7 to 10, the wheel and bushing assemblies are pushed over the opposite ends of the axle. As the outer axle bearing surface 31 passes through the bushing it spreads the fingers 46, 47 and 48 radially outwardly, permitting the axle to pass through the bushing, and as the axle surface 31 passes the ends of the fingers 46, 47 and 48 they snap radially inwardly into recesses 24 and 25 to their relaxed position. The fingers 46, 47 and 48 have substantially radial end surfaces 63 that engage recess radial surface 27 in the axle recesses to positively prevent removal of the wheels from the axle.

Figure 2:
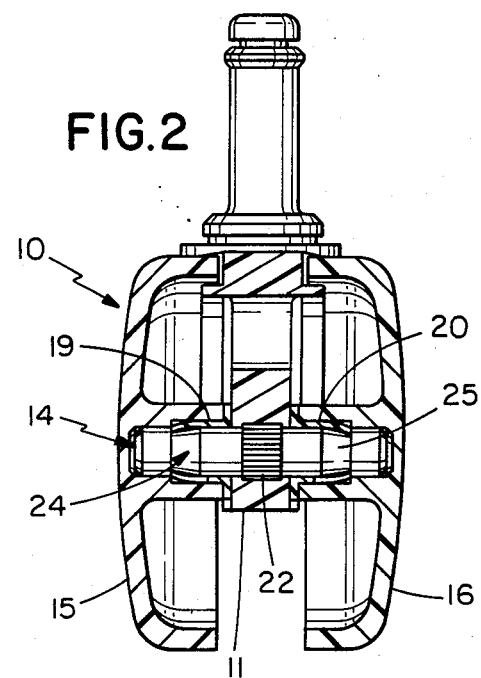
FIG. 2 is an enlarged longitudinal section taken generally along line 2—2 of FIG. 1 illustrating a caster axle and two bushings positioned in an assembled caster.

As seen in FIGS. 2 and 8 the axle recess shoulders 27 are positioned such that the rear surfaces 65 of the bushings engage horn sidewalls 66 and thus form a thrust bearing for the wheels 15, 16.

The annular body 38 of the bushings has an inner annular surface 67 with a diameter several thousandths inches larger than axle bearing surface 32, and it engages bearing surface 32 to provide additional rotational support for the wheels on the axle 14.

Thus, the bushings 19, 20 serve not only to permanently axially lock the wheels to the axle 14 but also provide a radial bearing for the wheels on the axle and an axial thrust bearing between the wheels and the horn 11.

I claim:

1. A method of attaching wheels to the axle of a dual wheel caster wherein the caster includes a central horn member that carries an axle having ends projecting from the horn member and the axle ends have generally annular recesses therein, the steps including: forming the wheels with axle receiving bores therein, forming bushings with an integral resilient projecting extending radially inwardly to a radius substantially less than the radius of the axle and with a radial flange on the opposite end thereof from the projection, inserting the bushings into the wheel bores until the flanges engage the wheels to limit inward movement of the bushings, bonding the bushings to the wheels prior to inserting the axle ends therein to thereby axially lock the bushings to the wheels and thereafter inserting the axle ends into the bushings until the bushing projections snap into the axle recesses to axially lock the wheels on the axle ends.

2. A method of attaching wheels to the axle of a dual wheel caster wherein the caster includes a central horn member that carries an axle having ends projecting from the horn member and the axle ends have generally annular recesses therein, as defined in claim 1, wherein the step of forming the bushings includes forming an annular plastic bushing with a plurality of generally axially extending spring fingers that curve radially inwardly to a diameter substantially equal to the inner diameter of the axle recesses.

3. A method of attaching wheels to the axle of a dual wheel caster wherein the caster includes a central horn member that carries an axle having ends projecting from the horn member and the axle ends have generally annular recesses therein, as defined in claim 2, including the step of ultrasonically welding the bushings to the wheels after the bushings are inserted into the wheel bores.

4. A method of attaching wheels to the axle of a dual wheel caster wherein the caster includes a central horn member that carries an axle having ends projecting from the horn member and the axle ends have generally annular recesses therein, as defined in claim 1, including the steps of forming the wheels with an inner reduced bearing bore having a diameter equal to the diameter of an outer portion of the axle ends so the axle outer portions rotatably support the wheels in their bearing bores, forming the wheels with a second enlarged outer bushing bore, and forming the bushing in annular configuration with an inner diameter equal to the diameter of a second portion of the axle ends inwardly of the recesses thereon so the axle second portions are received in and rotatably engage the bushings to assist in supporting the wheels on the axle.

5. A method of forming a dual wheel caster, including the steps of: forming an axle with annular bearing surface at the outer ends thereof and annular recesses adjacent the bearing surfaces, each having a radial abutment surface, forming the axle with second bearing surfaces inwardly of the recesses, attaching the axle to a central horn member so the axle ends project outwardly therefrom, forming wheels with a first inner reduced bearing bore having a diameter equal to the bearing surfaces on the axle ends to rotatably support the wheels on the axle, forming the wheels with a second enlarged outer bushing bore, forming plastic bushings in annular configuration with an inner diameter equal to the diameter of the second bearing surfaces on the axle so the second bearing surfaces rotatably engage the bushings to assist in supporting the wheels on the axle, forming the annular plastic bushings with a plurality of generally axially extending spring fingers that curve radially inwardly to a diameter substantially equal to the inner diameter of the axle recesses and with radial flanges at the ends thereof opposite the fingers, inserting the bushings into the wheel bores until the bushing flanges engage the wheels to limit the inward mmovement of the bushings in the wheels, bonding the bushings to the wheels prior to insertion of the axle ends therein to thereby axially lock the bushings to the wheels, and thereafter inserting the axle ends into the bushings until the bushing projections snap into the axle recesses to axially lock the wheels on the axle ends.

* * * * *